(12) United States Patent
Park et al.

(10) Patent No.: US 9,026,357 B2
(45) Date of Patent: May 5, 2015

(54) ELECTRIC BUS AND ELECTRIC BUS BATTERY EXCHANGE SYSTEM

(71) Applicants: Kookmin University Industry Academy Cooperation Foundation, Seoul (KR); Industry-University Cooperation Foundation of Korea Aerospace University, Goyang-si, Gyeonggi-do (KR)

(72) Inventors: Jun Seok Park, Seoul (KR); Won-Kyu Kim, Seoul (KR); Won-Jae Jung, Chuncheon-si (KR)

(73) Assignees: Kookmin University Industry Academy Cooperation Foundation, Seoul (KR); Industry-University Cooperation Foundation of Korea Aerospace University, Goyang-Si, Gyeonggi-Do (KR)

( * ) Notice: Subject to any disclaimer, the term of this patent is extended or adjusted under 35 U.S.C. 154(b) by 0 days.

(21) Appl. No.: 14/492,640

(22) Filed: Sep. 22, 2014

(65) Prior Publication Data

US 2015/0012212 A1    Jan. 8, 2015

Related U.S. Application Data

(62) Division of application No. 13/539,482, filed on Jul. 1, 2012, now Pat. No. 8,862,391.

(30) Foreign Application Priority Data

Jan. 31, 2012    (KR) .................. 10-2012-0010005

(51) Int. Cl.
*G01C 21/00* (2006.01)
*B60L 11/00* (2006.01)
*B60W 10/00* (2006.01)
*G01C 21/34* (2006.01)
*B60S 5/06* (2006.01)

(52) U.S. Cl.
CPC .............. *G01C 21/3407* (2013.01); *B60S 5/06* (2013.01); *B60R 2300/8086* (2013.01); *B60R 2300/00* (2013.01)

(58) Field of Classification Search
CPC ............ B60L 11/1822; B60L 11/1833; B60L 11/1835; B60L 11/1846; B60L 2200/18; Y02T 10/7005; Y02T 10/7072; Y02T 90/124; Y02T 90/125; Y02T 90/128; Y02T 90/14; Y02T 90/163; Y02T 90/169; Y02T 10/84; Y02T 90/16
USPC ............. 701/22–25, 420, 408–411, 428, 437, 701/436; 180/65.1, 65.625
See application file for complete search history.

(56) References Cited

U.S. PATENT DOCUMENTS 8,239,131 B2 *   8/2012   Kindo et al. ................... 701/436
2008/0277173 A1 *  11/2008   Midrouillet et al. ......... 180/65.1

FOREIGN PATENT DOCUMENTS

| JP | 2004-66889 | 3/2004 |
| JP | 2008-520173 | 6/2008 |
| JP | 2010-178450 | 8/2010 |
| JP | 2011-15549 | 1/2011 |
| JP | 2011-217460 | 10/2011 |

* cited by examiner

*Primary Examiner* — Muhammad Shafi
(74) *Attorney, Agent, or Firm* — Kile Park Reed & Houtteman PLLC

(57) ABSTRACT

Provided is an electric bus and an electric bus battery exchange system. The electric bus according to the present invention includes: a battery exchange hole disposed on top of the electric bus for exchanging a discharged battery for a charged battery; a front camera unit taking front images in the process of entering the battery exchange station for battery exchange; a communication unit for receiving position information of the battery exchange unit from the battery exchange station; a route output unit outputting a predicted driving route for reaching a swapping point below the battery exchange unit based on the front images taken by the front camera unit and the position information of the battery exchange unit; and a display unit displaying the predicted driving route outputted by the route output unit, superimposed on the front images taken by the front camera unit.

4 Claims, 5 Drawing Sheets

ELECTRIC BUS AND ELECTRIC BUS BATTERY EXCHANGE SYSTEM

CROSS-REFERENCE TO RELATED APPLICATION

This application is a divisional application of U.S. patent application Ser. No. 13/539,482, filed on Jul. 1, 2012 (currently pending), the disclosure of which is herein incorporated by reference in its entirety. The U.S. patent application Ser. No. 13/539,482 claims priority under 35 U.S.C. §119 to Korean Patent Application No. 10-2012-0010005 filed on Jan. 31, 2012, the disclosure of which is hereby incorporated by reference in its entirety.

BACKGROUND

1. Field of the Invention

The present invention relates to an electric bus and an electric bus battery exchange system, and more particularly, relates to the electric bus with an exchangeable battery and the electric bus battery exchange system that exchanges a discharged battery for a charged battery.

2. Description of Related Art

An electric bus refers to a bus powered by electric energy. The electric bus has an eco-friendly characteristic that does not emit harmful gases, compared with existing automobiles using fossil fuels. Thus, the research and commercialization of the electric bus is speeding up further.

For example, Seoul city has started the world's first electric bus since 2010, and is planning to expand the electric bus until 2014.

The electric buses that are being currently commercialized have a short mileage with one charge, so it is inevitable that they should stop by several battery exchange stations to get electric energy. However, stopping by the battery exchange station causes inconvenience to passengers, because it takes 30 minutes to charge a battery with current technology. Therefore, the electric buses are obliged to take a short route in order to not stop by the battery exchange station, or take only a flat route.

To solve above-mentioned problem, this applicant have proposed a battery exchange system that exchanges a discharged battery for a pre-charged battery. For instance, KR patent applications No. 2011-32024, No. 2011-34994, No. 2011-52913, etc are pending before the Korea patent office. According to the proposed technology, the battery is swapped quickly through a hole positioned on top of the electric bus for battery exchange, so that battery swapping can be completed during stoppage time for boarding. Therefore, there is no need to wait for battery swapping, and the electric bus can run effectively regardless of the length of route.

As mentioned above, when the battery is swapped through the hole positioned on top of the electric bus for battery exchange, it is necessary that the electric bus is positioned at exact place matched with a swapping point which is positioned above in order to exchange battery in a short time.

Therefore, this applicant proposes an electric bus and a battery exchange system that guides the electric bus to be positioned exactly at place matched with the swapping point without any equipment disturbing the route.

SUMMARY

The present invention is invented based on the above description, and an embodiment of the present invention is to provide an electric bus and an electric bus battery exchange system that guide the electric bus to be positioned exactly at place which is matched with the swapping point without any equipment disturbing the route.

To achieve the embodiment of the present invention, provided is an electric bus, including: a battery exchange hole disposed on top of the electric bus for exchanging a discharged battery for a charged battery by being connected to a battery exchange unit of a battery exchange station; a front camera unit taking front images in the process of entering the battery exchange station for battery exchange; a communication unit for receiving position information of the battery exchange unit from the battery exchange station; a route output unit outputting a predicted driving route for reaching a swapping point below the battery exchange unit based on the front images taken by the front camera unit and the position information of the battery exchange unit; and a display unit displaying the predicted driving route outputted by the route output unit, superimposed on the front images taken by the front camera unit.

The front camera unit could take front images only when a reservation of battery exchange exists, thereby reducing power consumption.

To achieve the embodiment of the present invention, provided is an electric bus battery exchange system comprising: a battery exchange station exchanging a discharged battery for a charged battery and comprising a battery exchange unit and a position information providing unit, wherein the battery exchange unit is projected out to be connected with a battery exchange hole positioned on top of the electric bus, and wherein the position information providing unit provides position information of the battery exchange unit to the electric bus; and an electric bus taking front images in the process of entering the battery exchange station for battery exchange, and outputting a predicted driving route for reaching a swapping point below the battery exchange unit based on the front images and the position information of the battery exchange unit.

The battery exchange station could comprise the plurality of battery exchange units, and further could comprise an exchange-position allocation unit selecting among the plurality of battery exchange units and allocating selected battery exchange unit to the electric bus as a position for exchanging the battery, and the electric bus outputs the predicted driving route for being positioned exactly below the battery exchange unit allocated by the exchange-position allocation unit.

The exchange-position allocation unit could reallocate one of the battery exchange unit among the plurality of battery exchange units by selecting by itself or being selected by the electric bus, in case that it is impossible for the electric bus to reach below the allocated battery exchange unit due to other electric buses being positioned below the allocated battery exchange, thereby obtaining the effectiveness.

The battery exchange station could further comprise a move-request unit, and the move-request unit transmits a signal for asking other electric buses to move away from the battery exchange unit, in case that it is impossible for the electric bus to reach below the allocated battery exchange unit due to the other electric buses being positioned below the allocated battery exchange unit.

According to the present invention takes front images when an electric bus enters a battery exchange station, and provides a predicted driving route which is for guiding the electric bus to a battery exchange point based on the front images. Therefore, the electric bus can reach exactly the battery exchange point.

DETAILED DESCRIPTION OF THE EMBODIMENTS

Figure 1:
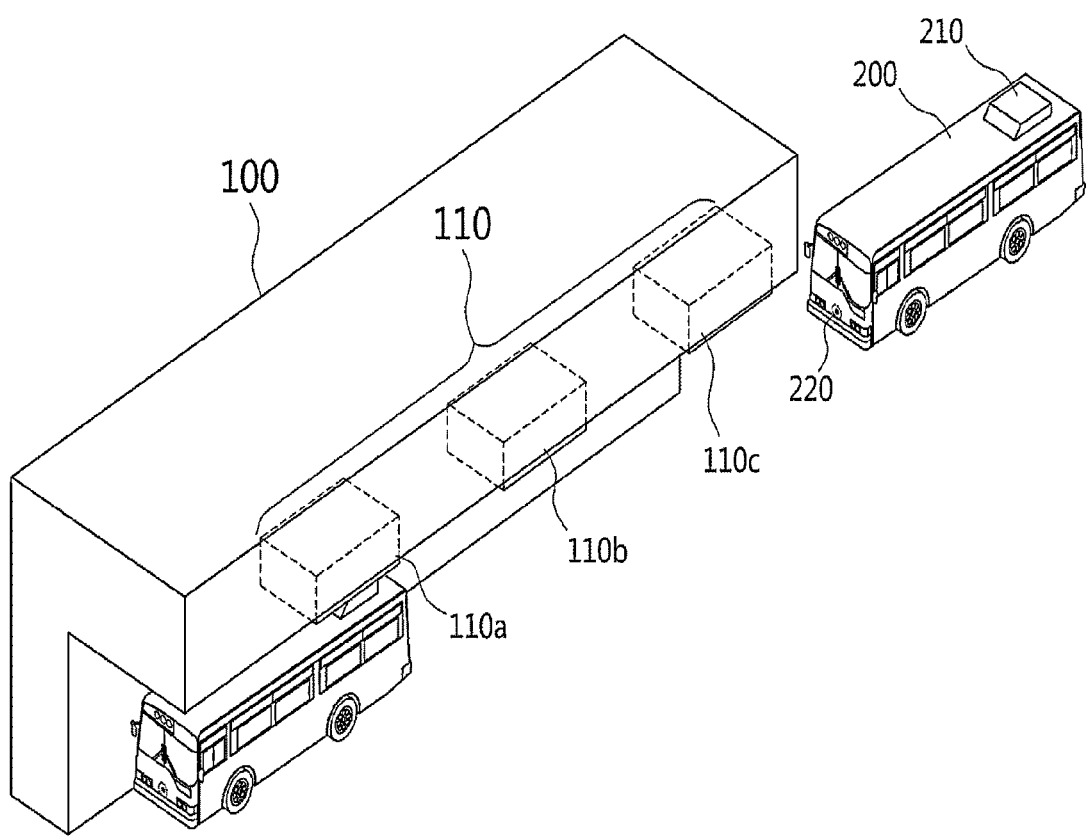
FIG. 1 and FIG. 2 are schematic views showing an electric bus battery exchange system according to an exemplary embodiment of the present invention.
Figure 2:
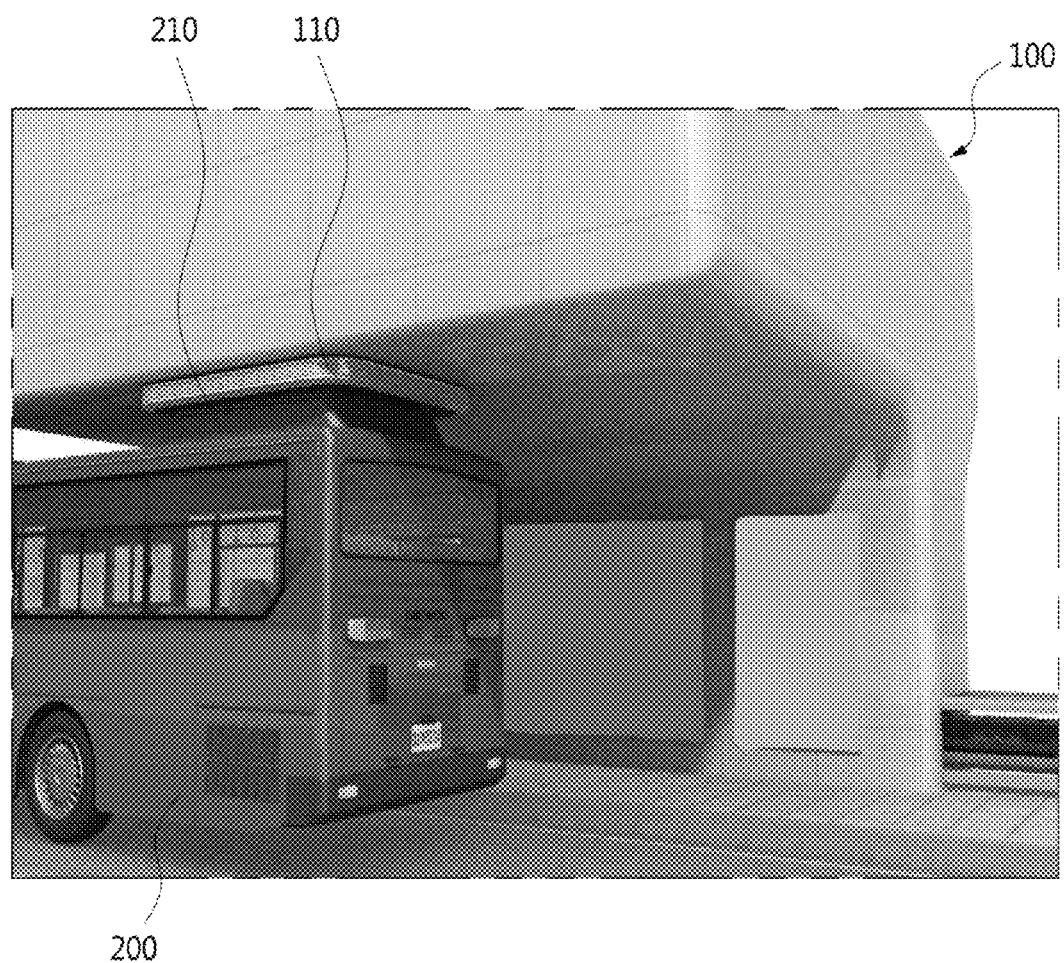

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings:

FIG. 1 and FIG. 2 are schematic views showing an electric bus battery exchange system according to an exemplary embodiment of the present invention.

As shown in FIG. 1 and FIG. 2, the electric bus battery exchange system according to the present invention includes a battery exchange station 100 and an electric bus 200.

The battery exchange station 100 is a structure where swapping operation is performed. When the electric bus 200 enters the battery exchange station 100, the battery exchange station 100 exchanges a discharged battery for a charged battery. The battery exchange station 100 provides information about position of battery swapping point so that the electric bus 200 can reach the battery swapping point.

The battery exchange station 100 is not restricted to its particular structure or shape. The battery exchange station 100 can have various structures or shapes on the condition that the battery exchange station 100 enables the electric bus 200 to get in or get out conveniently and the battery exchange operation can be performed. According to the exemplary embodiment, the battery exchange station 100 is configured to have a vertical body perpendicular to a road and a horizontal body extended from top of the vertical body to the road as shown in FIG. 1 and FIG. 2. Thus, the battery exchange station 100 is able to exchange batteries in spite of bad weather.

The electric bus 200 takes front images in the process of entering the battery exchange station 100 for battery exchange, and outputs a predicted driving route for reaching the battery swapping point based on the front images and the position information transmitted from the battery exchange station 100.

Hereinafter, with reference to FIG. 3 and FIG. 4, the battery exchange station 100 and the electric bus 200 will be explained more in detail.

Figure 3:
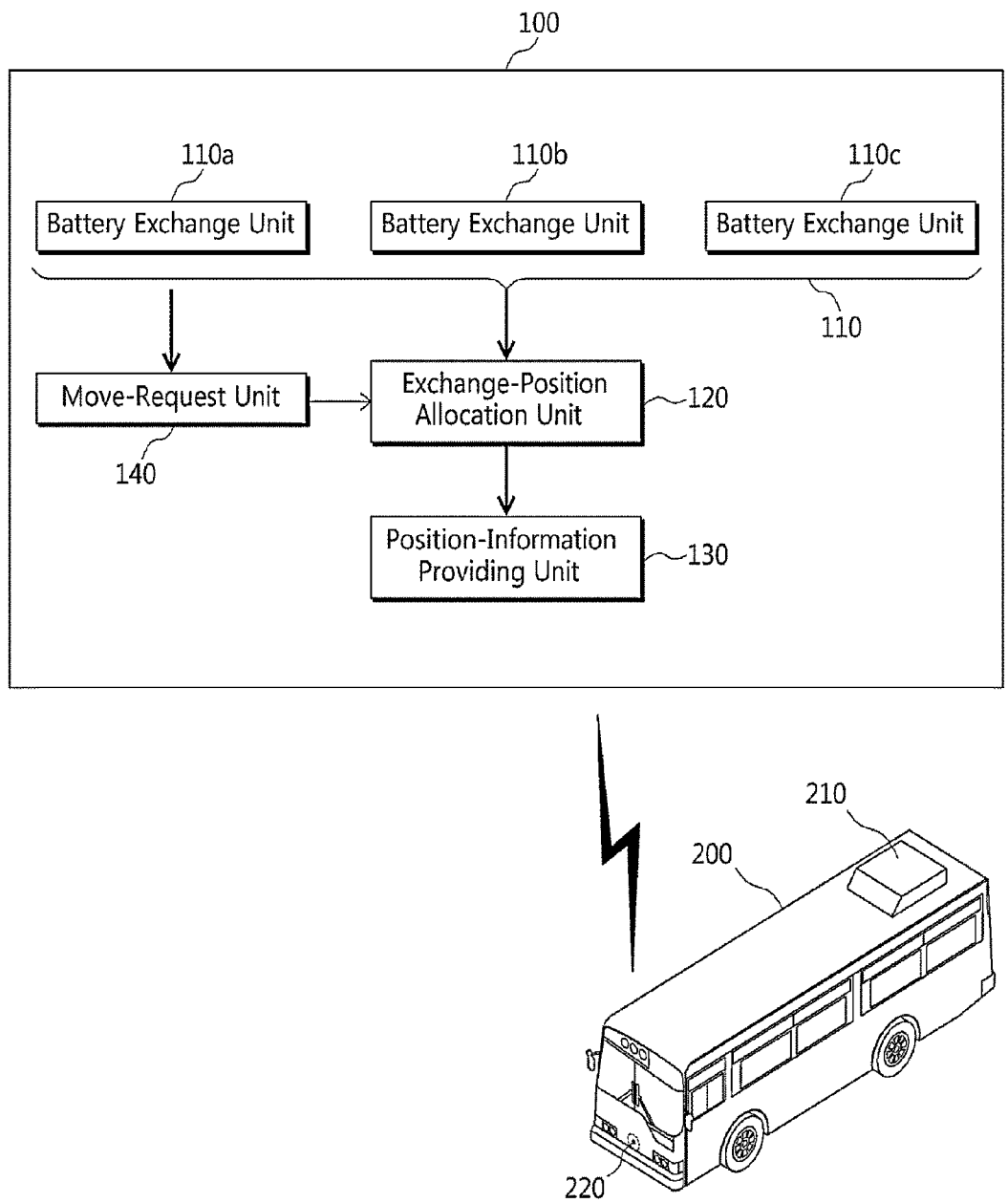
FIG. 3 is a block diagram showing the electric bus battery exchange system according to an exemplary embodiment.

FIG. 3 is a block diagram showing the electric bus battery exchange system according to an exemplary embodiment.

As shown in FIG. 3, the battery exchange station 100 includes a battery exchange unit 110, an exchange-position allocation unit 120, and a position-information providing unit 130.

The battery exchange unit 110 is a region in which battery exchange is practically performed. The battery exchange unit 110 is connected with a hole for battery exchange positioned on top of the electric bus 200 and exchanges the discharged battery for the charged battery through the hole. To achieve this, the battery exchange unit 110 is projected out to be connected with the hole positioned on top of the electric bus, and includes battery exchange robots for removal or installation of battery, which is not shown. The battery exchange station 100 can include the plurality of battery exchange units 110, which can be helpful to save time by providing charged batteries to the several electric buses 200 at the same time.

The exchange-position allocation unit 120 selects one among the plurality of battery exchange units 110 and allocates to the electric bus 200, in case that the battery exchange station 100 includes the plurality of battery exchange units 110. To achieve this, the exchange-position allocation unit 120 stores information about battery-exchange-state of each of the battery exchange units 110, which is helpful to minimize the waiting time for battery exchange and enables the battery exchange station 100 to manage effectively by allocating the battery exchange unit 110 relatively easy to access.

The exchange-position allocation unit 120 can reallocate the battery exchange unit 110, in case that the electric bus 200 is not able to reach the pre-allocated battery exchange unit 110. For example, it is need to be reallocated in case that other electric bus 200 which are not allocated or people are positioning below the allocated battery exchange unit 110, or the allocated battery exchange unit 110 needs to be repaired. In this case, the exchange-position allocation unit 120 can reallocate by selecting one among the plurality of battery exchange units 110 by itself. The exchange-position allocation unit 120 can also reallocate the battery exchange unit 110, which is selected by the electric bus 200, after analyzing whether the selected battery exchange unit 110 is able to be accessed. To achieve this, the battery exchange station 100 can include sensors like image sensors or infrared sensors for detecting the presence of electric buses 200 or people below the battery exchange units 110.

The position-information providing unit 130 transmits position-information of the battery exchange unit 110 to the electric bus 200. The position-information providing unit 130 transmits the position-information of the battery exchange unit 110, which is allocated by the exchange-position allocation unit 120, in case that the battery exchange station 100 includes the plurality of battery exchange units 110. The position-information providing unit 130 includes communication means for communicating with the electric bus 200 and stores the position information of the battery exchange units 110.

The electric bus battery exchange station 100 according to the exemplary embodiment of the present invention could further include a move-request unit 140 transmitting a signal for asking other electric buses 200 to move away from the battery exchange unit 110, current position. The move-request unit 140 transmits the signal to the other electric buses 200, in case that it is impossible for the electric bus 200 to access to the allocated battery exchange unit 110 because the other electric buses 200 are being positioned below the allocated battery exchange unit 110. When the other electric buses 200 move away from the allocated battery exchange unit 110 in response to the request of the move-request unit 140, the electric bus 200 could access the allocated battery exchange unit 110. On the other hand, in case that the other electric buses 200 cannot move away somewhere, the exchange-position allocation unit 120 reallocates the battery exchange unit 110.

Figure 4:
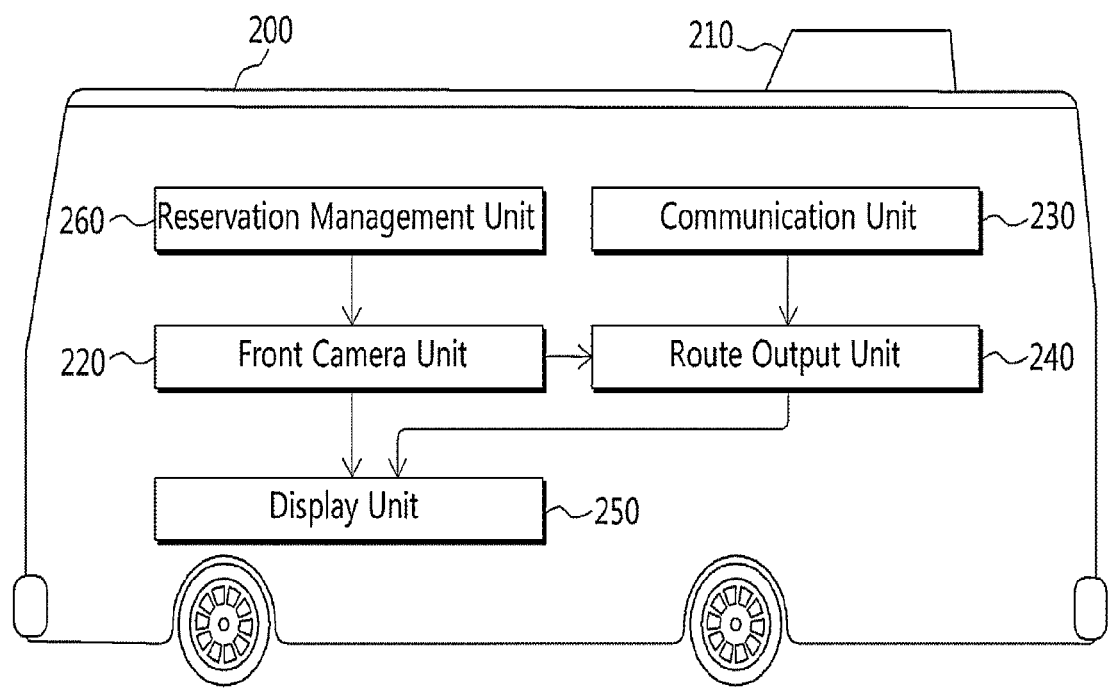
FIG. 4 is a block diagram showing the electric bus according to an exemplary embodiment.

FIG. 4 a block diagram showing the electric bus 200 according to an exemplary embodiment.

As shown in FIG. 4, the electric bus 200 according to the exemplary embodiment includes a battery exchange hole 210, a front camera unit 220, a communication unit 230, a route output unit 240, a display unit 250, and a reservation management unit 260.

The battery exchange hole 210 disposed on top of the electric bus 200 is a hole, through which the discharged battery is removed, and the charged battery is provided.

The front camera unit 220 takes front images in the process of entering the battery exchange station 100 in order to exchange a battery. The front camera unit 220 can include either a single camera or a plurality of cameras for taking front images. The camera is placed on front of the electric bus 200, so that the camera can take images of front roads and close objects while electric bus 200 runs. The various types of cameras, for example, CCD cameras or CMOS cameras can be applied as the front camera unit 220.

The communication unit 230 is for communicating with the battery exchange station 100. The various communication methods, including CDMA can be applied as the communication unit 230. The communication unit 230 receives information about the battery exchange unit 110, which is allocated by the exchange-position allocation unit 120 of the battery exchange station 100, and information about position of the allocated battery exchange unit 110, which is transmitted from the position-information providing unit 130. The information received through the communication unit 230 is used as basis of outputting a predicted driving route for reaching exactly below a battery exchange point.

The route output unit 240 outputs the predicted driving route for reaching an exact point below the battery exchange unit 110 in which the battery exchange performs, based on the front images taken by the front camera unit 220 and the position-information of the battery exchange unit 110 received through the communication units 230. That is, the route output unit 240 outputs the predicted driving route, which is to guide the electric bus 200 to the point where the battery exchange can performs, with battery exchange hole 210 is connected with the battery exchange unit 110. The route output unit 240 outputs the predicted driving route based on the information about surroundings and close objects having potential to affect the electric bus 200, which is obtained by analyzing the front images, and also based on the distance to the battery exchange unit 110 obtained by position-information of the battery exchange unit 110. At this time, the route output unit 240 could also consider information about state of gears, angle of gears, speed of the vehicle, height of the vehicle, and so on.

In case that the battery exchange station 100 includes the plurality of battery exchange units 110, the route output unit 240 outputs the predicted driving route which is to guide the electric bus 200 to the battery exchange unit 110 allocated by the exchange-position allocation unit 120.

The display unit 250 displays the predicted driving route outputted by the route output unit 240. The predicted driving route is displayed superimposed on the front images taken by the front camera unit 220.

Figure 5:
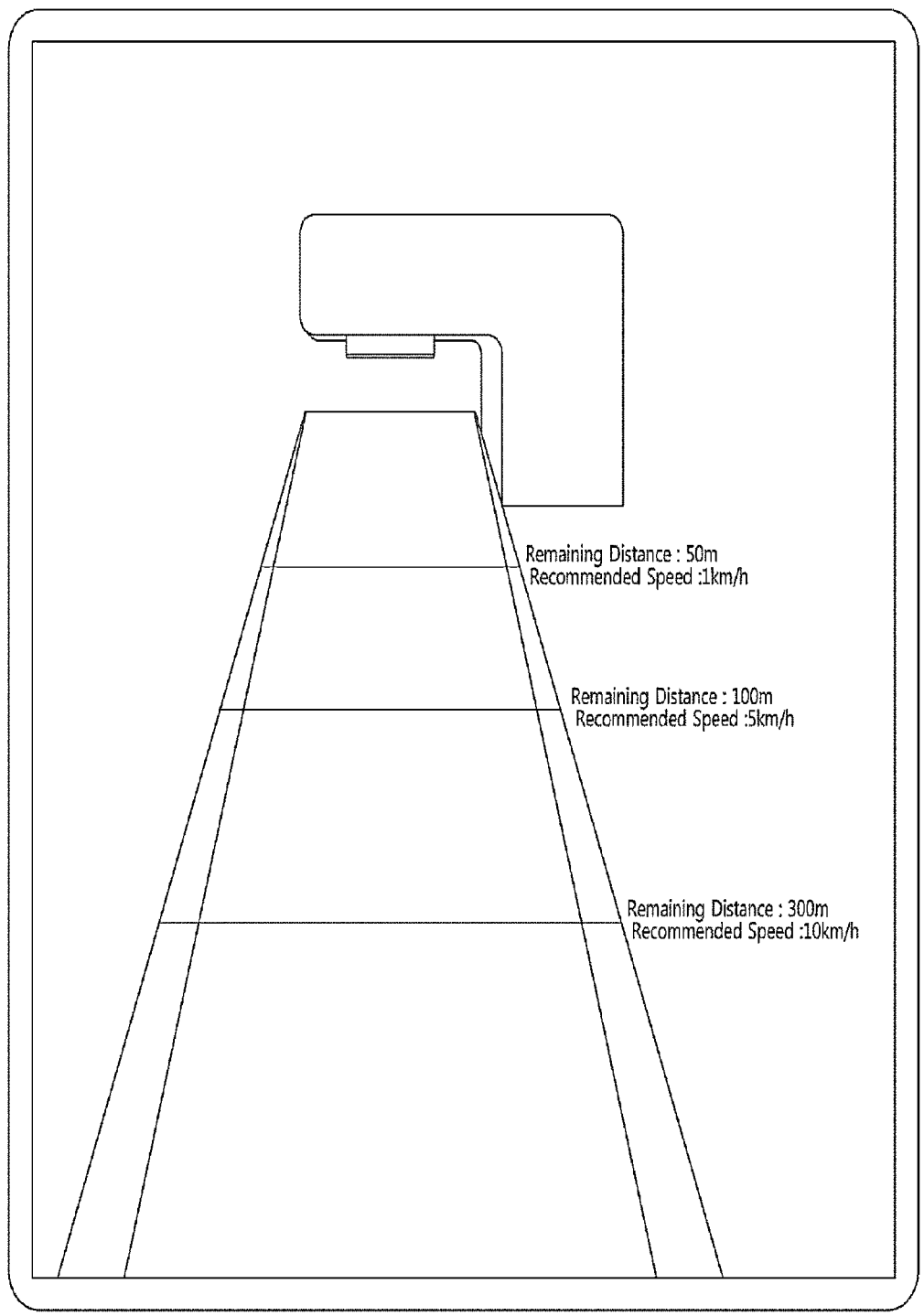
FIG. 5 is an example of a screen displayed on a display unit of the electric bus according to an exemplary embodiment of the present invention.

FIG. 5 is an example of a screen displayed on a display unit 250 of the electric bus 200 according to an exemplary embodiment of the present invention.

As shown in FIG. 5, the front images of the electric bus 200 and the predicted driving route which is to guide the electric bus 200 to the point below the battery exchange unit 110 in which the battery exchange performs are displayed on the display unit 250, superimposed each other. At this time, the display unit 250 can also displays distance remained to the battery exchange unit 110 in which the battery exchange performs, and recommended speed of vehicle at each section of the predicted driving route, which is outputted based on the distance remained.

The electric bus 200 according to the exemplary embodiment of the present invention could further include the reservation management unit 260. The reservation management unit 260 stores information of reservations like existence of the reservation for battery change, reservation time, and so on. The reservation management unit 260 checks whether the reservation for battery exchange exists. Only when the reservation exists, that is, only when the electric bus 200 enters the battery exchange station 100 for exchanging the battery, the reservation management unit 260 controls the front camera unit 220 to take the front images. As a result, in case that the battery exchange station 100 is also used as a bus stop, only when the electric bus 200 enters for battery exchange, the route output unit 240 predicts the driving route, thereby reducing the load of communication and power consumption caused by outputting the predicted driving routed, and so on.

The above description is suggested only as an exemplary embodiment for realizing the electric bus 200 and the electric bus battery exchange system according to the present invention described above. The present invention is not limited to the exemplary embodiment. For example, the electric bus 200 could raise the alarm for a driver, in case that the electric bus 200 is running beyond the pre-determined margin of error from the predicted driving route outputted by the route output unit 240. Then, the driver can modify the driving route according to the predicted driving route.

It will be apparent that various changes and modifications may be made by those skilled in the art without deviating from the basic concept and scope of the invention as set forth in the appended claims.

What is claimed is:

1. An electric bus battery exchange system comprising:
    a battery exchange station exchanging a discharged battery for a charged battery and comprising a battery exchange unit and a position-information providing unit, wherein the battery exchange unit is projected out to be connected with a battery exchange hole positioned on top of the electric bus, and wherein the position-information providing unit provides position information of the battery exchange unit to the electric bus; and
    an electric bus taking front images in the process of entering the battery exchange station for battery exchange, and outputting a predicted driving route for reaching a swapping point below the battery exchange unit based on the front images and the position information of the battery exchange unit.

2. The electric bus battery exchange system of claim 1, wherein the battery exchange station comprises the plurality of battery exchange units, and further comprises an exchange-position allocation unit selecting among the plurality of battery exchange units and allocating selected battery exchange unit to the electric bus as a position for exchanging the battery, and
    wherein the electric bus outputs the predicted driving route for being positioned exactly below the battery exchange unit allocated by the exchange-position allocation unit.

3. The electric bus battery exchange system of claim 2, wherein the exchange-position allocation unit reallocates one of the battery exchange unit among the plurality of battery exchange units by selecting by itself or being selected by the electric bus, in case that it is impossible for the electric bus to reach below the allocated battery exchange unit due to other electric buses being positioned below the allocated battery exchange unit.

4. The electric bus battery exchange system of claim 2, wherein the battery exchange station further comprises a move-request unit, and wherein the move-request unit transmits a signal for asking other electric buses to move away from the battery exchange unit, in case that it is impossible for the electric bus to reach below the allocated battery exchange unit due to the other electric buses being positioned below the allocated battery exchange.

* * * * *